UNITED STATES PATENT OFFICE.

ALEXIS C. HOUGHTON, OF SYRACUSE, NEW YORK.

PROCESS OF FORMING MONOBASIC ORGANIC PEROXIDS.

No. 851,752.     Specification of Letters Patent.     Patented April 30, 1907.

Application filed April 28, 1906. Serial No. 314,240.

*To all whom it may concern:*

Be it known that I, ALEXIS C. HOUGHTON, a citizen of the United States, residing at Syracuse, in the county of Onondaga, State of New York, have invented certain new and useful Processes of Forming Monobasic Organic Peroxids; and I do declare the following to be a full, clear, and exact description of the invention, such as will enable others skilled in the art to which it appertains to make and use the same.

This invention relates to the manufacture of a class of compounds which may be described as monobasic organic peroxids.

There are many specific compounds of this class to the manufacture of which this process is applicable, of which compounds benzoyl succinyl peroxid patented May 22, 1906, No. 821,291 may be taken as a specific case.

In general terms the process consists in the treatment of a monobasic aromatic peracid with the anhydrid of a dibasic fatty acid and the removal of the monobasic organic peroxid formed, by filtration or extraction with a suitable solvent.

In forming the specific compound benzoic succinyl peroxid 100 CC of a 10% watery solution of benzoyl peracid, preferably acidified with acetic acid is agitated with five (5) grams of succinic anhydrid until the reaction is complete, when the benzoyl succinyl peroxid is removed by filtration. The reaction which takes place may be expressed as follows:—

$$C_7H_6O_3 + C_4H_4O_3 = C_{11}H_{10}O_6.$$

The compounds formed by this process are characterized by the intense germicidal action of their aqueous solutions.

The specific compound benzoyl succinyl peroxid has the formula $C_{11}H_{10}O_6$, and it is further characterized by the following properties:—It is a colorless crystalline body, very soluble in acetone, soluble in acetic-ether, chloroform and alcohol; moderately soluble in benzene; slightly soluble in acetic acid; insoluble in ligroin. It has a melting point of about 92° C and decomposes at 96° C.

Having thus fully set forth my invention, what I claim as new and desire to secure by Letters Patent is:—

1. The herein described process of forming monobasic organic peroxids which consists in treating a monobasic aromatic peracid with the anhydrid of a dibasic fatty acid.

2. The herein described process of forming benzoyl succinyl peroxid which consists in agitating an aqueous solution of benzoic peracid with succinic anhydrid until the reaction is complete, and in then removing the precipitate.

In testimony whereof, I sign this specification, in the presence of two witnesses:

ALEXIS C. HOUGHTON.

Witnesses:
   WM. A. FANCHER,
   J. B. MACKISSICK.